United States Patent
Boyer et al.

[15] 3,644,121
[45] Feb. 22, 1972

[54] METHOD OF PREPARING REHYDRATABLE DEHYDRATED PROTEIN PRODUCTS

[72] Inventors: Robert A. Boyer, Creve Coeur; Arthur A. Schulz; Edmond A. Schatzman, both of St. Louis, all of Mo.

[73] Assignee: Ralston Purina Company, St. Louis, Mo.

[22] Filed: Jan. 5, 1970

[21] Appl. No.: 505

Related U.S. Application Data

[63] Continuation-in-part of Ser. No. 210,843, July 18, 1962, abandoned, Continuation-in-part of Ser. No. 841,899, Aug. 23, 1965, abandoned, Continuation of Ser. No. 729,370, May 15, 1968, abandoned.

[52] U.S. Cl. ................................................99/17 R, 99/14
[51] Int. Cl. ......................................................A23l 1/20
[58] Field of Search ................................................99/14, 17

[56] References Cited

UNITED STATES PATENTS

| | | | |
|---|---|---|---|
| 2,952,543 | 9/1960 | Szczesniak et al. | 99/14 |
| 3,210,195 | 10/1965 | Kjelson et al. | 99/14 |
| 2,785,069 | 3/1957 | Dudman | 99/14 |

FOREIGN PATENTS OR APPLICATIONS

| | | | |
|---|---|---|---|
| 699,692 | 11/1953 | Great Britain | 99/14 |

*Primary Examiner*—A. Louis Monacell
*Assistant Examiner*—Roger B. Andewelt
*Attorney*—R. W. Brukardt and D. J. Nikaido

[57] ABSTRACT

A rehydratable dehydrated protein product is made by mixing stretched, oriented precipitated isolated protein filament fibers with a food flavor and a heat-setting protein binder to form a moldable mixture, setting up the mixture and dehydrating it. The dehydrated product rapidly reconstitutes upon addition of water to form a product analogous to the mixture before dehydration.

6 Claims, No Drawings

METHOD OF PREPARING REHYDRATABLE DEHYDRATED PROTEIN PRODUCTS

This application is a continuation-in-part of our application Ser. No. 210,843 filed July 18, 1962, now abandoned, and application Ser. No. 841,899 filed Aug. 23, 1965, now abandoned, and is a continuation of copending application Ser. No. 729,370 filed May 15, 1968, now abandoned.

This invention relates to the manufacture of protein products and more particularly to dehydrated protein products which may be easily rehydrated to form desirable protein products.

Briefly, the present invention relates to a rehydratable dehydrated protein product formed by mixing precipitated isolated protein filaments with a food flavor and a heat-setting protein binder to form a moldable mixture, heating the moldable mixture to bind the fibers together and dehydrating the resulting product.

Among the several objects of this invention are the provision of dehydrated protein products; the provision of products of the type indicated which may be easily rehydrated; the provision of products of the type indicated which after rehydration are desirable food products; and the provision of methods of the type indicated which may be easily carried out. Other objects will become apparent to those skilled in the art.

The invention accordingly comprises the products and methods hereinafter described, the scope of the invention being indicated in the claims hereinafter set forth.

Protein food products formed from precipitated protein filaments are described in U.S. Pat. Nos. 2,682,466, 2,730,447 and 2,730,448. While these products are valuable and have found important uses, their utility would be expanded if they could be dehydrated and stored, followed by rehydration if desired just prior to the desired use. Such a process, however, presents problems since the rehydrated product, for example, should be of the reasonably tender but chewy type which characterizes the product before dehydration. It is well known that natural meat products after dehydration are difficult to rehydrate and after rehydration customarily provide a tough and rubbery product.

In accordance with the present invention it has been found that a dehydratable mixture can be formed by mixing together stretched, oriented precipitated isolated protein filaments prepared in the manner described in the above identified U.S. Patents with a food flavor and a heat-setting protein binder. Although various types of isolated protein filaments may be employed in the invention, it is preferred that isolated soy protein filaments be used. In this manner, a moldable mixture can be produced which, after heating to bind the fibers together, can be dehydrated, usually after subdividing, to form a stable, dry product. The heating is carried out under conditions such that the protein binder is raised to a temperature of at least about 150° F.; preferably 170°–180° F., to cause the fibers to bind together.

The binders employed in the present invention are heat-setting, i.e., once heated and dried, the binders will not return to a liquid or soft pasty state upon contact with water. In the present invention, the heat-setting binders are mixed together with the isolated protein fibers and the resulting mixture is heated to set the binder and bind together the fibers. The fiber mixture is dried and subsequently contacted with water to rehydrate the mixture. The fiber mixture, upon rehydration, does not separate into smaller or finer particles, but retains its physical structure. If, however, non-heat-setting binders such as cereals and starches are employed, the fiber mixture tends to separate and fall apart after drying and upon rehydrating, since the binder returns to a liquid or soft pasty state providing little if any binding for the fibers. As a result, the fiber mixture tends to separate into smaller pieces instead of retaining a particular shape or form where heat-setting binders are employed. The product of the invention appears to possess wicklike characteristics since upon rehydration it rapidly absorbs water and forms a product physically resembling the mixture before dehydration.

In addition it has been found that the properties of the rehydrated product can be varied by the incorporation of additional components in the mixture prior to dehydration. Such properties are obtained by the addition of varying amounts of trisodium phosphate, the variation of the pH of the mixture before dehydration, and the variation of the proportion of water in the mixture. Furthermore, the flavor of the rehydrated product as well as its color is determined by the flavor and color components which may be added to the mixture prior to molding.

The following examples are illustrative of the invention and are not intended to limit the scope thereof.

EXAMPLE 1

Beef-type granules simulating ground beef or hamburger may be prepared by mixing together the following components:

| | |
|---|---|
| 100 g. | Precipitated isolated soy protein filaments, (50% moisture) water washed to remove excess acid and salt |
| 8 g. | Hydrolyzed vegetable protein (Maggi 4BE) |
| 2 g. | Hydrolyzed vegetable protein (Huron 4561C) |
| 8 ml. | Burnt sugar (75.3% solids, Union Starch) |
| 10 g. | Albumin |
| 10 ml. | Trisodium phosphate (10% solution) |
| 3 ml. | Garlic solution (0.5%) |
| 50 ml. | $H_2O$ |

A bath containing the other components is made up and the stretched precipitated protein filament is immersed therein to thoroughly impregnate the fibers. The fibers are then formed into a loaf and heated in an oven at 320° F. for 30 minutes. The loaf is then removed from the oven, cooled and ground like hamburger. The ground product is then dehydrated during a period of 2 hours at a temperature of 150° F. The resulting dehydrated product may be stored or shipped and held until needed.

The dehydrated product rehydrates upon the addition of water within one to 10 minutes and may then be used in the preparation of meatless spaghetti, chili or similar type dishes or used per se as ground "meat."

EXAMPLE 2

A dehydrated ham-type product is prepared having the following composition:

| | |
|---|---|
| 100 g. | Precipitated isolated soy protein filaments (50% moisture) water washed to remove excess acid and salt |
| 10 g. | Albumin |
| 12 g. | Ham flavor |
| 3 g. | Hydrolyzed vegetable protein (Maggi 3H1) |
| 3.5 g. | NaCl |
| 3.5 g. | Monosodium glutamate |
| 10 ml. | Trisodium phosphate (10% solution) |
| 4 ml. | Red-brown color solution |
| 2 ml. | Red color solution |
| 0.8 ml. | Liquid smoke (5% solution) |
| 5 g. | Lactose |
| 93 ml. | $H_2O$ |

All ingredients less the fiber are made up into a bath and the fiber is subsequently immersed in the bath until it is impregnated with the flavor. A loaf is then formed from these fibers and set up in the oven at 320° F. as described in Example 1. The resulting loaf is then cooled, sliced, diced or shredded and the subdivided product is dehydrated in the manner described in Example 1. The resultant product is stable and may be conveniently stored or shipped. After rehydration, in the manner specified in Example 1, the product may be used to provide a ham-type component for casserole-type dishes, soups, etc.

EXAMPLE 3

A chicken-type dehydrated product is prepared from the following components:

| | | |
|---|---|---|
| 100 | g. | Precipitated isolated soy protein filaments (50% moisture) water washed to remove excess acid and salt |
| 10 | g. | Albumin |
| 12.5 | g. | Chicken flavor |
| 3 | g. | Hydrolyzed vegetable protein (Maggi 3H3) |
| 2 | g. | NaCl |
| 15 | ml. | Trisodium phosphate (10% solution) |
| 2 | drops | Red color solution |
| 100 | ml. | H$_2$O |

A loaf is formed and set up at 320° F. in the manner described in Example 1. After the loaf is cooled it may be cubed and dehydrated as described in Example 1. The dehydrated cubes may be rehydrated with water to form a chicken-type product for use in soups, chicken salads, chicken pot pies and the like.

EXAMPLE 4

A dehydrated bacon-type product is formed from the following components:

| | | |
|---|---|---|
| 500 | g. | Precipitated isolated soy protein filaments (50% moisture) water washed to remove excess acid and salt |
| 20 | g. | Koch hydrolyzed vegetable protein |
| 10 | g. | Busch flavor solids |
| 80 | g. | Bacon flavor |
| 6 | ml. | Red color solution |
| 10 | g. | Albumin |
| 200 | g. | Protein powder solution (30 g. solids) |
| 10 | ml. | Smoke, 5% solution |
| 400 | ml. | H$_2$O |

The ingredients other than the isolated precipitated protein filaments are thoroughly mixed in a suitable mixer. The filaments are then immersed in this bath and removed in tow form. The single tow form is then placed on trays and formed into a loaf as described in Example 1. When removed from the oven the fiber tow is diced or shredded and dehydrated as described in Example 1. The rehydrated product may be used in bean soup, corn bread, pancakes, cheese spreads, salads, salad dressing, seasoning, and the like.

EXAMPLE 5

A dehydrated beef-type granules product is formed from the following components:

| | | |
|---|---|---|
| 5,000 | g. | Precipitated isolated soy protein filaments (50% moisture) |
| 500 | g. | Albumin |
| 500 | g. | Skim milk |
| 125 | g. | Hydrolyzed vegetable protein (Maggi 4BE) |
| 160 | g. | Beef flavoring |
| 60 | g. | Onion (powdered) |
| 40 | g. | MerTaste flavor |
| | | All of the above ingredients are dry. |
| 400 | ml. | Burnt sugar solution (75.3% solids) |
| 75 | ml. | Red color solution |
| 48 | ml. | Sodium sulfite (10% solution) |
| 360 | ml. | Trisodium phosphate (20% solution) |
| 700 | ml. | H$_2$O |
| 480 | g. | Stable vegetable oil (Durkex 500) |
| 120 | ml. | Sodium hydroxide |

The dry and wet ingredients, except the sodium hydroxide and protein filament, are mixed together in a suitable mixer. The 5,000 g. of filaments are chopped in an urshel machine which utilizes a revolving blade to accomplish the result. The fibers are then added to the mixer and impregnated with the mixture formed therein. While this can be done mechanically, it can also be carried out by squeezing the bath through the fiber material by hand. The 120 mls. of sodium hydroxide are then added to the fiber mixture and after a few minutes of mixing in the mixer, the resulting composition is ground in a grinder. The ground product is placed on trays and heated in a dryer at 180° F. until a 5 percent moisture content is obtained.

The dehydrated product can be stored until needed and subsequently rehydrated by the addition of water as in Example 1. The rehydrated product may be used in the preparation of meatless spaghetti, chili or similar type dishes, or used per se as ground "meat."

In lieu of first rehydrating the dehydrated products of Examples 2, 3, 4 and 5, the dehydrated product itself may be utilized in the preparation of various foods.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense:

What is claimed is:

1. The method of forming a rehydratable dehydrated protein product from stretched, oriented, precipitated, isolated protein filament fibers which rehydrates on addition of water to provide a product substantially resembling the original protein product prior to dehydration, which comprises mixing such precipitated, isolated protein filament fibers with a food flavor and a heat setting protein binder added in proportions of from about 2 to about 10 percent of the weight of the protein filament fibers to form a moldable fiber mixture which, upon dehydration and subsequent rehydration, does not separate into finer particles, forming the mixture, heating the mixture at a temperature sufficient to cause binding of the filament fibers together, and dehydrating the resulting protein product.

2. The method according to claim 1 wherein the protein binder in the mixture is elevated to a temperature of 170° to 180° F.

3. The method according to claim 1 wherein the isolated protein filament fibers are isolated soy protein filament fibers.

4. The method of forming a rehydratable dehydrated meat type protein product from stretched, oriented, precipitated, isolated protein filament fibers which rehydrates on addition of water to provide a meat-type product substantially resembling the original product prior to dehydration which comprises mixing such precipitated protein filament fibers with a meat flavor selected from the group consisting of beef flavor, ham flavor, bacon flavor and chicken flavor and a heat setting protein binder added in proportions of from about 2 to about 10 percent of the weight of the protein filament fibers to form a moldable fiber mixture which, upon dehydration and subsequent rehydration, does not separate into finer particles, forming the mixture, heating the mixture to raise the temperature of the protein binder to approximately 170° to 180° F. to bind the filament fibers together, subdividing and dehydrating the product.

5. The method according to claim 4 wherein the isolated protein filament fibers are isolated soy protein filament fibers.

6. The method of forming a rehydratable dehydrated meat type product from stretched, oriented, precipitated, isolated soy protein filament fibers which rehydrates on addition of water to provide a meat type product substantially resembling the original product prior to dehydration which comprises mixing such precipitated soy protein filament fibers with a meat flavor selected from the group consisting of beef flavor, ham flavor, bacon flavor and chicken flavor and a heat setting protein binder added in proportions of from one-fiftieth to one-tenth of the weight of the protein filament fibers to form a moldable fiber mixture which, upon dehydration and subsequent rehydration, does not separate into finer particles, forming the mixture, heating the mixture to raise the temperature of the protein binder to approximately 170° to 180° F. to bind the filament fibers together, subdividing and dehydrating the product.

* * * * *